(12) United States Patent
Vasylyev et al.

(10) Patent No.: US 7,607,429 B2
(45) Date of Patent: Oct. 27, 2009

(54) MULTISTAGE SYSTEM FOR RADIANT ENERGY FLUX TRANSFORMATION COMPRISING AN ARRAY OF SLAT-LIKE REFLECTORS

(75) Inventors: Sergiy Victorovich Vasylyev, Elk Grove, CA (US); Viktor Petrovych Vasylyev, Kharkiv (UA)

(73) Assignee: SVV Technology Innovations, Inc., Sacramento, CA (US)

( * ) Notice: Subject to any disclaimer, the term of this patent is extended or adjusted under 35 U.S.C. 154(b) by 88 days.

(21) Appl. No.: 11/581,989

(22) Filed: Oct. 16, 2006

(65) Prior Publication Data

US 2007/0035864 A1 Feb. 15, 2007

Related U.S. Application Data

(63) Continuation-in-part of application No. 10/339,123, filed on Jan. 9, 2003, now abandoned, which is a continuation-in-part of application No. 10/026,121, filed on Dec. 17, 2001, now Pat. No. 6,971,756.

(51) Int. Cl.
*F24J 2/10* (2006.01)

(52) U.S. Cl. .................. 126/692; 359/852; 359/853

(58) Field of Classification Search ......... 359/851–853, 359/867, 857, 858; 126/684, 685, 686–695; 136/246

See application file for complete search history.

(56) References Cited

U.S. PATENT DOCUMENTS

| | | | |
|---|---|---|---|
| 2,759,106 A * | 8/1956 | Wolter | 378/43 |
| 2,766,385 A * | 10/1956 | Herrnring et al. | 378/70 |
| 2,819,404 A * | 1/1958 | Herrnring et al. | 378/43 |
| 3,543,024 A | 11/1970 | Kantor | |
| 4,022,186 A | 5/1977 | Northrup, Jr. | |
| 4,130,107 A | 12/1978 | Rabl et al. | |
| RE30,027 E | 6/1979 | Hockman | |
| 4,162,824 A | 7/1979 | Ma | |
| 4,312,329 A | 1/1982 | Carver et al. | |
| 4,337,758 A | 7/1982 | Meinel et al. | |
| 4,337,759 A | 7/1982 | Popovich et al. | |
| 4,388,481 A | 6/1983 | Uroshevich | |
| 4,462,392 A | 7/1984 | Tipton | |
| 5,180,441 A | 1/1993 | Cornwall et al. | |
| 5,374,317 A | 12/1994 | Lamb et al. | |
| 5,578,140 A | 11/1996 | Yogev et al. | |
| 5,592,932 A | 1/1997 | Yeomans | |
| 5,968,839 A | 10/1999 | Blatt et al. | |
| 5,982,562 A | 11/1999 | Rode | |
| 6,049,588 A * | 4/2000 | Cash, Jr. | 378/85 |
| 6,620,995 B2 | 9/2003 | Vasylyev et al. | |
| 2002/0075579 A1 | 6/2002 | Vasylyev et al. | |
| 2005/0195506 A1* | 9/2005 | McGuire, Jr. | 359/861 |

* cited by examiner

*Primary Examiner*—Stephone B Allen
*Assistant Examiner*—Jennifer L. Doak

(57) ABSTRACT

A radiant energy flux transformation system including a primary linear focus concentrating collector formed by a plurality of cylindrical slat-like reflectors and a secondary elongated collector is described. The reflectors of primary collector generally have concave or planar transversal profiles and are positioned in a stepped arrangement with longitudinal axes being parallel to each other and to the secondary collector. The reflectors are tilted away from the direction to the source of radiant energy at a range of angles being less than 45° to reflect and direct the incident energy flux to a common focal region located below the primary collector where the concentrated flux is intercepted and further transformed by the secondary collector. In addition to efficient concentrating radiant energy such as sunlight, the system can provide uniformity or a desired energy distribution in the concentrated flux.

16 Claims, 6 Drawing Sheets

MULTISTAGE SYSTEM FOR RADIANT ENERGY FLUX TRANSFORMATION COMPRISING AN ARRAY OF SLAT-LIKE REFLECTORS

CROSS-REFERENCE TO RELATED APPLICATIONS

This application is a continuation-in-part of application Ser. No. 10/339,123 filed Jan. 9, 2003, now abandoned which is a continuation-in-part of application Ser. No. 10/026,121 Dec. 17, 2001, now U.S. Pat. No. 6,971,756.

BACKGROUND OF THE INVENTION

1. Field of the Invention

The present invention relates to a device for concentrating and transforming radiant energy with a multistage energy flux transformation system. In particular, this invention relates to linear focus solar energy concentrators.

2. Description of Prior Art

It is well known that cylindrical parabolic mirrors and Fresnel lenses are used to concentrate the solar radiation which intensity is otherwise fairly low at the ground level for its direct use. While parabolic mirrors are notably superior in concentration over the lenses, this prior art design concept has the limitation of requiring tight shape and alignment tolerances to keep the concentrated sunlight focused onto a narrow target area. On the other hand, there is a limitation of energy collection ability of one-stage energy concentrators related to finite angle (one half degree) the sun subtends. As a result, the concentrated beam projected on the target has poorly defined boundaries because they are formed by the rays mainly emanated from the edge portions of the solar disk. These outer rays also have a longer path length giving rise to a larger transversal spread of the focal line.

Various arrangements have been proposed in the past for improving the sunlight collection of linear focus devices by introducing secondary optics into the concentrated beam reflected from the primary parabolic mirror. One of the major problems of such past proposals is the inherent problem of partial shadowing the primary concentrator by the secondary and relative inaccessibility of the focal line which hampers the utility of the devices.

The known multi-reflection systems, such as those derived from Cassegrain telescope optics, have a further drawback that the entire flux reflected by the primary mirror is entirely redirected back by the secondary mirror resulting in a longer path of concentrated flux and decreased concentration efficiency.

None of these previous efforts provides the benefits attendant with the present invention. The present invention achieves its intended purposes, objects and advantages over the prior art devices through a new, useful and unobvious combination of component elements and operation, at a reasonable cost to manufacture, and by employing only readily available materials.

It is an object of this invention to provide an improved radiant energy flux transformation system which increases the concentration of incident flux impinging on the primary reflector structure without disposing the secondary collector in the path of incident flux.

Another object of this invention is to provide an improved radiant energy flux transformation system which provides improved focusing for off-axis rays with minimum reflections and minimizes energy losses.

It is yet another object of the present invention to provide a system for radiant energy flux transformation which is composed by relatively simple optical elements and which is of compact and sturdy construction.

A further object is to provide an efficient reflective energy collecting system capable of substantially uniformly distributing the concentrated flux over a receiver surface.

Other objects and advantages of this invention will be apparent to those skilled in the art from the following disclosure and appended claims.

BRIEF SUMMARY OF THE INVENTION

In accordance with the present invention, the prior art problems are solved by a multistage system for radiant energy flux transformation comprising a primary concentrating collector being a rear-focus reflector structure and an elongated secondary collector. The primary collector is formed by an array of slat-like reflective surfaces having longitudinal axes extending parallel to each other and reflecting the incident energy to a plurality of converging directions to form a common linear focal area. Each reflective surface is tilted away from the direction to the energy source at an angle preferably less than 45° so that the incident flux is reflected from it at an angle being greater than 45° and not greater than 90° to provide a rear disposition of the focal area formed by the primary collector. The secondary collector is disposed in energy receiving relation with at least one of reflective surfaces of the primary collector to intercept and redirect at least a part of radiant energy flux reflected from the primary collector so that the efficiency of desired flux transformation is increased.

According to one aspect of the invention, in a preferred embodiment, there is provided a multistage system for radiant energy flux transformation in which reflective surfaces of the primary collector are designed and positioned to minimize screening and shadowing on other reflective surfaces. The primary collector can also incorporate two or more symmetric segments facing toward each other.

According to another aspect of the invention, when it is applied to transforming and utilizing solar energy, the focal line of concentrated sun rays is situated below the primary reflector structure with the advantageous result that the secondary concentrating collector can be disposed in a close proximity to said focal line without shadowing the primary collector and without associated energy loss. The multistage system for radiant energy flux transformation can further incorporate a photovoltaic receiver.

According to yet another aspect of the invention there is provided a multistage system for radiant energy flux transformation in which reflective surfaces of the primary collector have concave profiles represented by simple or compound segments of parabolic or circular shape. The shape of at least one reflective surface of the primary collector is selected so as to result in the transversal spread of the corresponding radiant energy flux reflected by the surface and impinging upon the secondary collector being smaller than the energy receiving aperture of the surface.

According to a further aspect of the invention there is provided a multistage system for radiant energy flux transformation in which the energy secondary collector can be mechanically separated from the primary collector. Furthermore, one or more reflective surfaces of the primary collector can be disposed in any one of a translated, a reversed and/or a rotated orientation relative to the others having the same basic arrangement.

DRAWING FIGURES

DESCRIPTION OF THE PREFERRED EMBODIMENTS

The embodiments of flux transformation systems selected for the purpose of illustrating the invention include a primary rear-focus concentrating flux collector and an elongated secondary flux collector.

Figure 1:
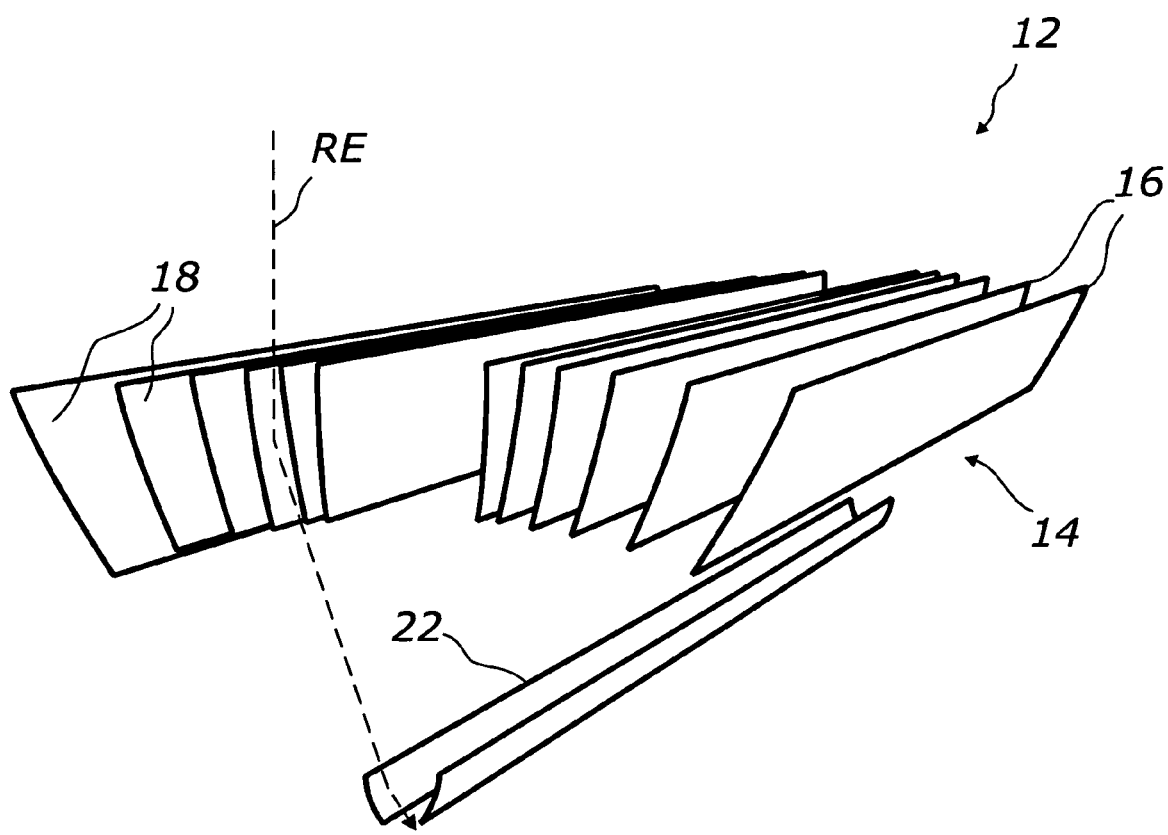
FIG. 1 is a perspective view of a multistage system for radiant energy flux transformation in accordance with a preferred embodiment of the present invention.

FIG. 1 shows a perspective schematic view of a system 12 for concentrating and transforming radiant energy flux according to a preferred embodiment. System 12 includes a primary concentrating collector 14 comprising an array of cylindrical elongated reflectors 16 with longitudinal axes generally aligned parallel to a reference line (not shown), and an elongated secondary concentrating collector 22 extending parallel to reflectors 16. The array of reflectors 16 comprises two symmetric segments where reflectors 16 are spaced apart and positioned adjacent to each other.

Reflectors 16 are individually tilted and aligned in a stepped arrangement, so that primary collector 14 has a linear Venetian blind-like configuration with the front longitudinal edges of reflectors 16 facing the source of radiant energy and the rear longitudinal edges of reflectors 16 facing away from the source. Reflectors 16 have mirrored surfaces 18 having concave transversal profiles to provide the energy focusing capabilities for each reflector 16. The concave profile of each surface 18 is individually selected so that the respective energy beam reflected by the mirrored surface converges in the proximity of a predefined common linear focal area of collector 14. Furthermore, reflectors 16 are arranged relatively to each other so that the concentrated beam formed by each reflector is at least partially superimposed with the concentrated beam formed by an adjacent reflector at the common focal area.

In order to entirely utilize the radiant energy received by the primary collector aperture, adjacent reflectors 16 can be appropriately spaced relatively to each other so that all incident radiation is intercepted and no energy is lost. Additionally, reflectors 16 can be arranged one with regard to the adjacent one in such a manner that the energy portions reflected by one reflector are not intercepted by the adjacent reflector.

It is important, according to the invention, that each reflector 16 is tilted away from the direction to the energy source at an angle preferably less than 45°. It will be appreciated by those skilled in the art that, as a matter of geometry, the angles of incidence and, consequently, the angles of reflection of radiant energy impinging on surfaces 18 will be greater than 45° and not greater than 90° thus providing the rear disposition of the focal area formed by primary collector 14. Furthermore, according to a preferred embodiment, reflectors 16 can be positioned at successively increasing distances from and at successively increasing angles to the plane of symmetry of primary collector.

Secondary collector 22 should be disposed in energy receiving relation with at least one of mirrored surfaces 18 of primary collector 14 and located relatively remote from surfaces 18. According to a preferred embodiment, secondary collector 22 can be a line-focus energy collector of a known type. By way of example, as shown in FIG. 1, secondary collector 22 can include two symmetrically disposed, curved trough mirrors facing toward each other. Secondary collector 22 is disposed so that its entrance aperture is facing primary collector 14 for receiving radiant energy and its smaller exit aperture is facing away from primary collector 14.

Reflectors 16 can easily be fabricated using a number of means and materials. For example, reflectors 16 can be made of metal through extrusion of a metal part, roll-forming, slip rolling from sheet material, pressing, moulding, machining, or electroforming, and then polished on the reflecting side to obtain the required specular reflectivity for surfaces 18. In an alternative example, plastic compound materials can be used for fabricating elements 16 and a foil or non-metal aluminized or silvered film can be used as a reflective material for mirrored surfaces 18. A thin, sheet metal material can be used with a reinforced backing to provide the longitudinal stiffness for the reflectors. The required reflectivity can be achieved by incorporating a layer of highly reflective aluminum or silver laminated by a protective transparent layer of scratch- and weather-resistant plastic or other material.

Secondary collector 22 can include a pair of planar or curved reflectors which can be fabricated using similar methods and materials as reflectors 16. Alternatively, secondary collector can be a refractive optical concentrator or flux homogenizer made from a transparent material such as glass or PMMA acrylics and redirecting the radiation by means of refraction and/or total internal reflection (TIR).

Multistage system 12 for radiant energy flux transformation forming the object matter of this invention can be based on a primary concentrating collector 14 comprising a number of reflectors 16 having individual parabolic transversal profiles and dimensions to obtain improved concentration of radiant energy. In view of that the construction of parabolic profiles can be relatively difficult, we propose a slight modification of collector 14 employing circular profiles for reflectors 16 or profiles formed by simple or a combination of two or more planar segments. Moreover, according to a further modification, reflectors 16 can be constructed with identical circular shapes and dimensions thus greatly simplifying the manufacturing process and enabling batch fabrication. Furthermore, one or more reflectors 16 can be planar or have a profile represented by a combination or a set of conjugate straight segments approximating a curved shape.

Reflectors 16 and secondary collector 22 can be interconnected or mounted to a frame in any suitable manner. For example, a frame may be provided which comprises walls (not shown) of metal, plastic, wood or other material extending transversely of the reflective element longitudinal axes at the reflector ends to support both primary and secondary collectors. Suitable tubular frame members (also not shown) may interconnect the walls to form a rigid structure.

Figure 2:
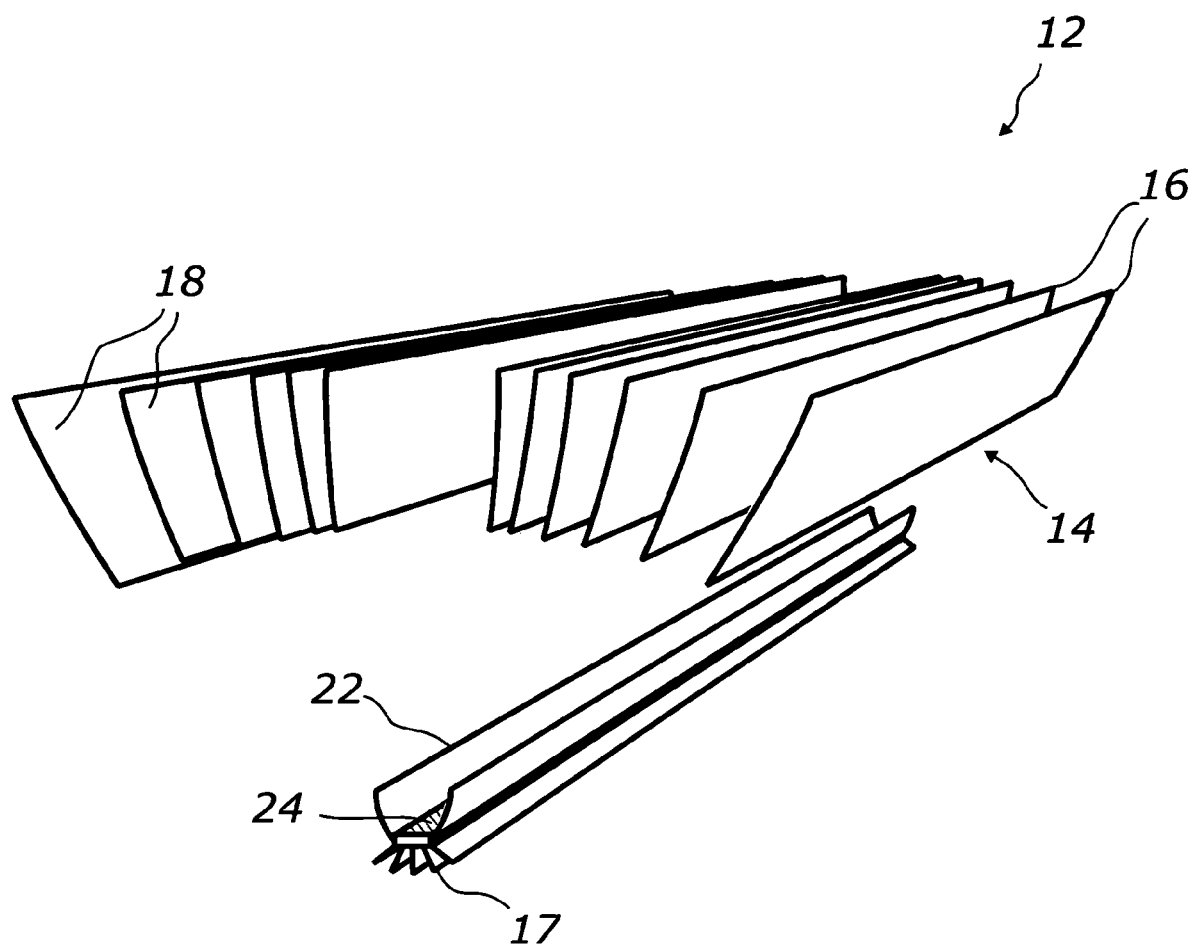
FIG. 2 is a perspective schematic view of an embodiment of the invention further comprising a photovoltaic receiver and a heat sink.

System 12 can further comprise a receiver for receiving and converting the concentrated energy flux to whatever useful type of energy. For example, as shown in FIG. 2, a narrow-strip photovoltaic panel 24 can be provided for converting solar energy to electricity. Panel 24 can further include a heat sink 17 for heat extraction. Panel 24 can also be disposed in thermal relation to secondary collector 22 for improved heat dissipation.

System 12 can further incorporate a tracking device operatively connected to the primary and secondary collectors to follow the movement of the source of radiant energy. The tracking device may include mechanical, hydraulic, electric and electronic components such as are well-known in the art. By way of example, if system 12 is used to concentrate and utilize solar energy, a one-axis tracker can be employed with orienting the longitudinal axes of primary and secondary collectors in South-North direction and East-West tracking the movement of the sun. In another example, the receiver can incorporate a thermal collector of the planar or tubular shape for collecting the heat from the radiant energy flux cooperatively concentrated by both primary collector 14 and secondary collector 22.

In operation, when system 12 is used to collect and transform solar energy, incident radiant energy RE strikes mirrored surfaces 18 of primary collector 14. Each surface 18 concentrates radiant energy RE by reflecting the energy into a convergent flux and directing the flux through the space between a pair of adjacent reflectors 16 towards the common focal area of collector 14. Secondary collector 22 disposed in the proximity of the common focal area of collector 14 receives at least a portion of radiant energy RE at the entrance aperture and further redirects and concentrates the energy onto a smaller focal area located at the exit aperture. According to a preferred embodiment of the invention, primary collector 14 composed by an array of reflectors 16 concentrates the incident radiation and directs it toward secondary collector 22 by means of a single specular reflection.

Figure 3:
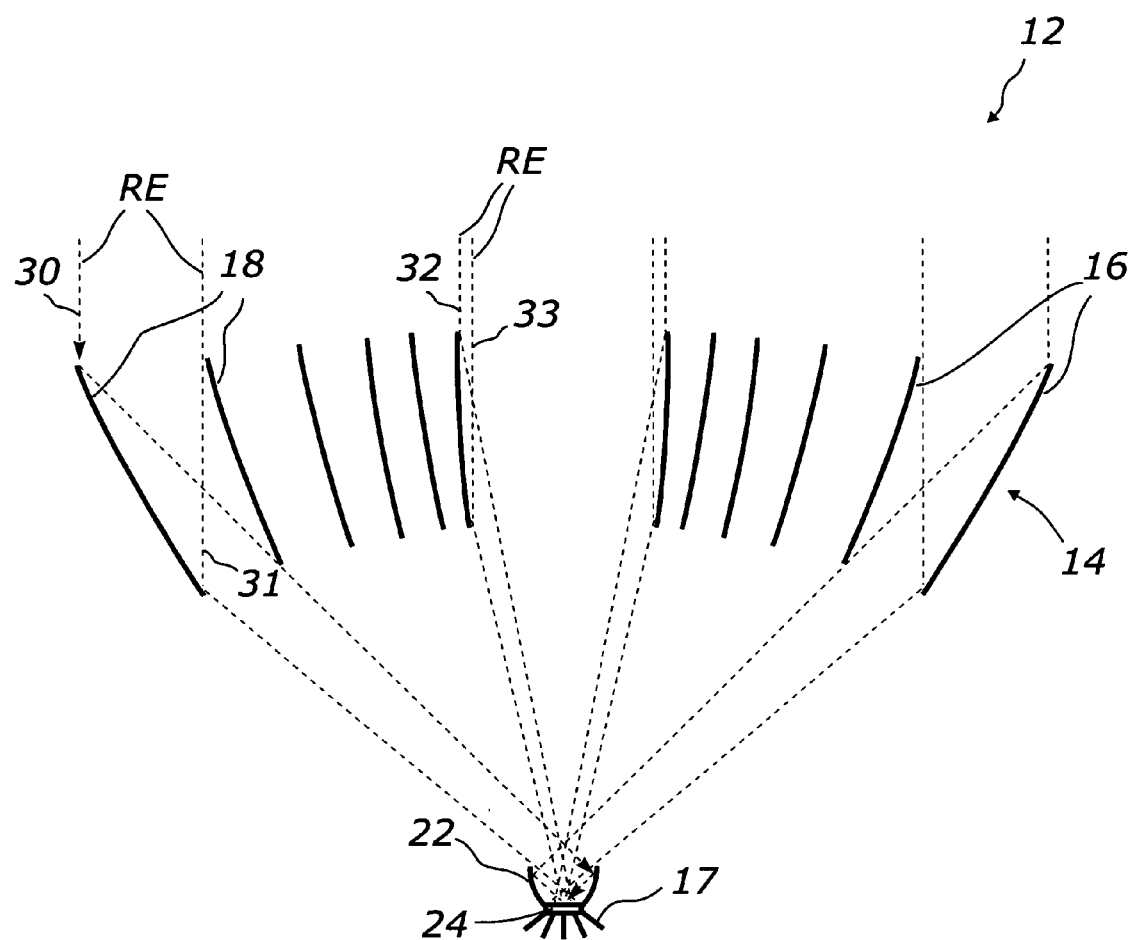
FIG. 3 is a schematic orthogonal view of the system shown in FIG. 2.

FIG. 3 more fully illustrates operation of the system shown in FIG. 2 when it is applied to transforming and utilizing solar energy. Referring to FIG. 3, incident rays 31, 32, and 33 of sunlight RE strike surfaces 18 of reflectors 16 arranged so that these rays are reflected from surfaces 18 and focused directly on the target area of receiving panel 24 using a single reflection. Incident ray 30, which can be an off-axis ray emanated by a peripheral zone of the solar disk and/or a ray impinging on an edge zone of surface 18, is reflected from surface 18 to a proximity of the focal area of primary collector 14 where ray 30 is intercepted by secondary collector 22 and redirected to panel 24 so that no energy is lost and net concentration is improved. In other words, energy portions reflected from the respective surfaces 18 of primary collector 14 are individually focused onto a relatively small entrance aperture of secondary collector 22 and at least partially intercepted by the secondary collector. Secondary collector 22 further transforms the energy flux cooperatively formed by surfaces 18 at the entrance aperture so that the concentrated energy flux formed at the exit aperture and projected on target panel 24 will have a smaller transversal spread and sharply defined boundaries and the radiant energy will be further intensified.

In an embodiment, secondary collector 22 can be designed to intercept and redirect only peripheral parts of the concentrated flux formed by primary collector 14 without intercepting the central rays of the primary flux. This produces an improved concentration and flux uniformity using minimum reflections and minimum energy loss. Furthermore, since the individual concentrated beam formed by an uttermost reflector 16 will strike a planar target such as panel 24 at a greater incidence angle compared to the beams formed by inner reflectors 16, it will tend to produce the largest focal spot on the target. Therefore, in an embodiment of the invention, secondary collector 22 can be designed to intercept the off-axis rays from only one or more outermost reflectors 16 and allow the rest of concentrated energy to pass through collector 22 without being redirected by collector 22. This operation is illustrated in FIG. 4 which also shows the irradiance distributions formed by primary collector in target plane 28 with and without secondary collector 22.

Figure 4:
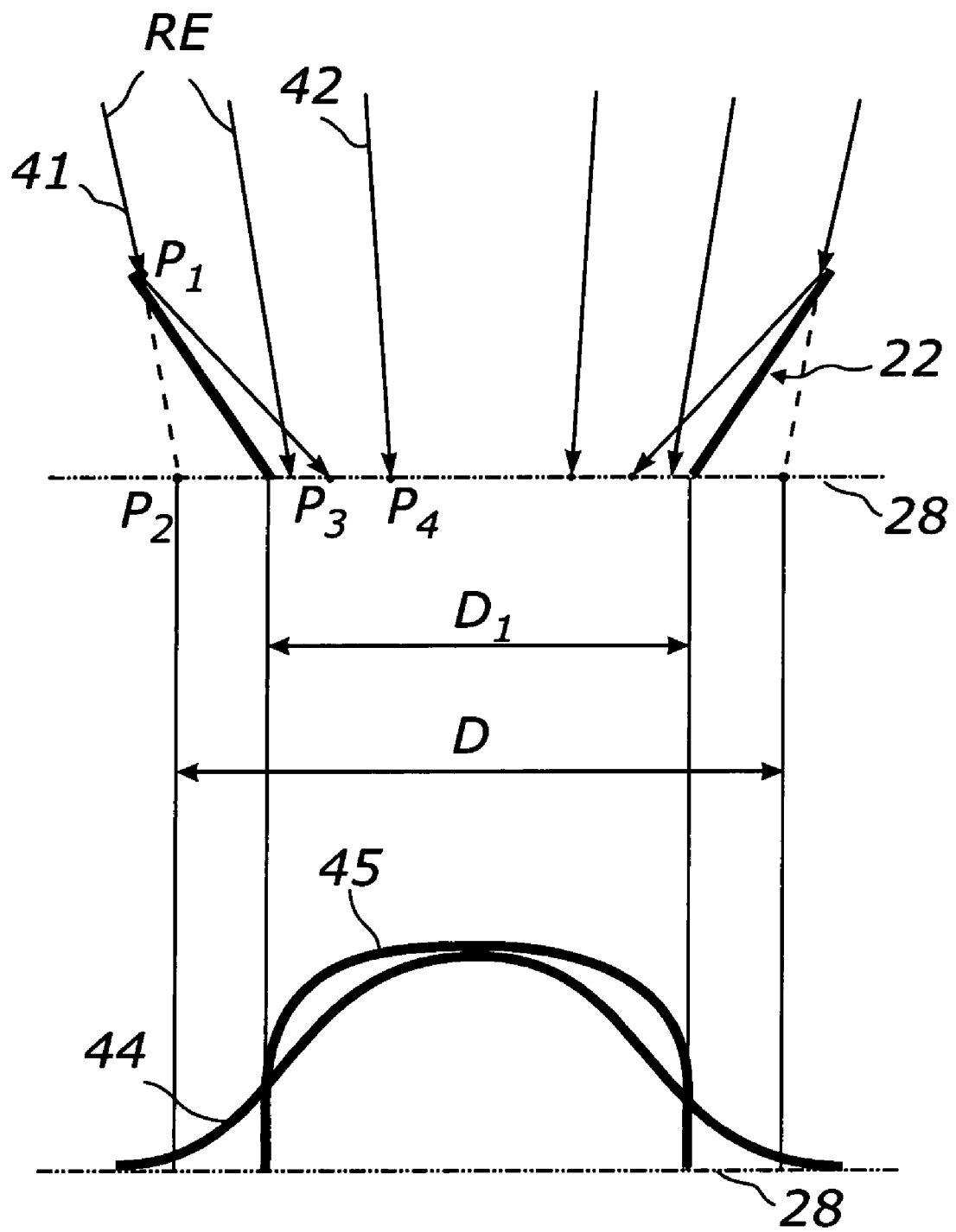
FIG. 4 is a detailed view of a secondary collector employing a pair of reflectors.

Referring to FIG. 4, an incident ray 42 of sunlight RE reflected from one of the central reflectors 16 of primary collector 14 strikes target plane 28 at a point $P_4$ without being intercepted by secondary collector 22. At the same time, an extreme off-axis ray 41 reflected by an outermost reflector 16 strikes secondary collector 22 at a point $P_1$ and is redirected by collector 22 to a point $P_3$ of target plane 28 within the boundaries of the exit aperture of collector 22. Obviously, the size of the focal spot of system 12 will be defined in this case by the size $D_1$ of the exit aperture of secondary collector 22, and the resulting irradiance distribution on the target plane 28 will have relatively sharp boundaries such as those described by a profile 45.

Should there be no secondary collector 22, ray 41 would strike target plane 28 at a point $P_2$ which is located at a greater distance from the center of the focal zone of system 12 than point $P_3$. Thus, without secondary collector 22, the energy distribution in the target plane will have a greater transversal spread D and highly non-uniform profile 44. Since secondary collector 22 is designed to result in $D_1$ being smaller than D, the concentration ratio being improved. Additionally, as illustrated by the comparison of profiles 44 and 45 in FIG. 4, the redistribution of the peripheral off-axis rays according to this invention improves the uniformity of the concentrated flux.

Other Embodiments

Figure 5:
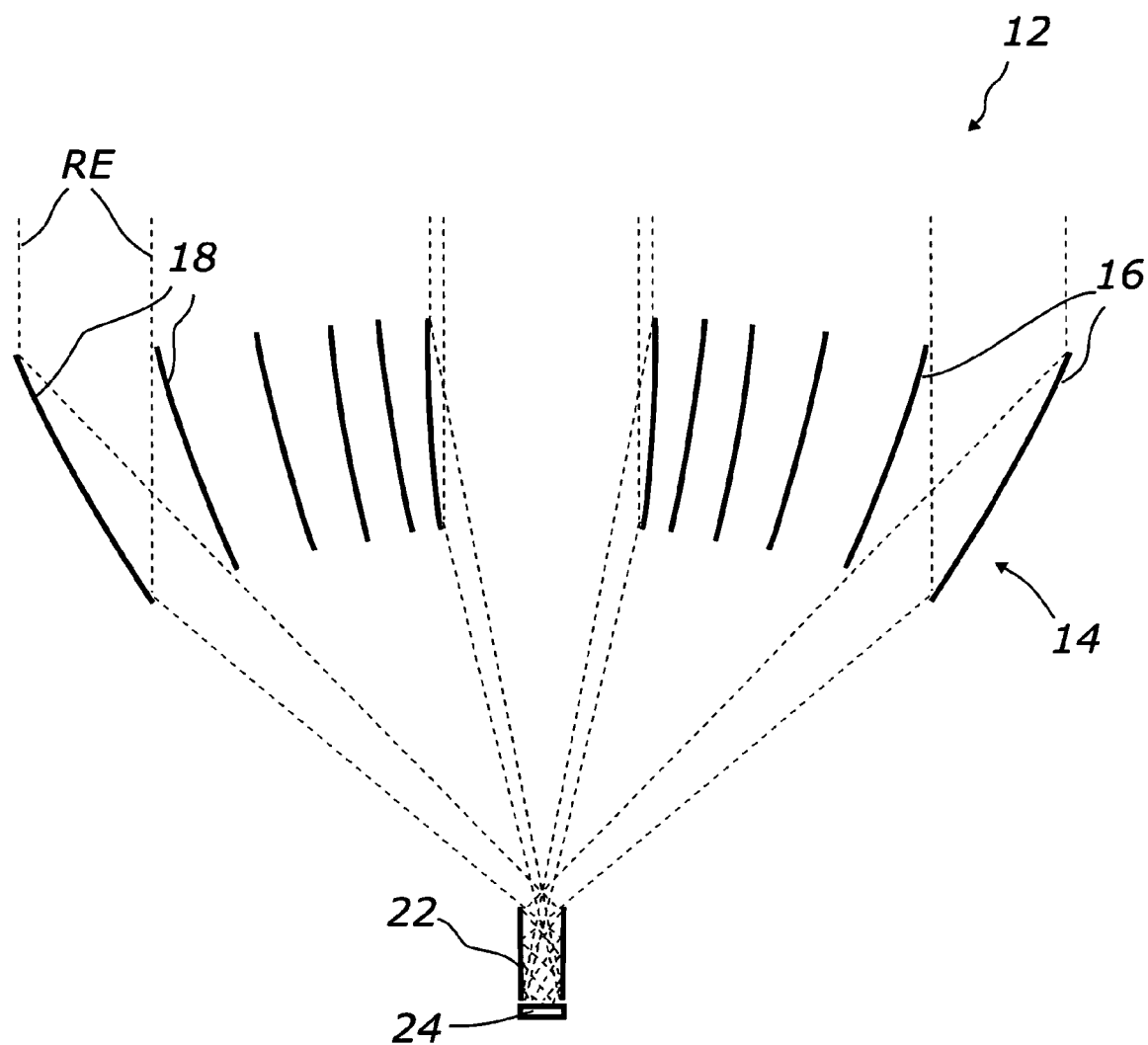
FIG. 5 is a schematic orthogonal view of a further embodiment of the invention employing a flux homogenizer as the secondary collector.
Figure 6:
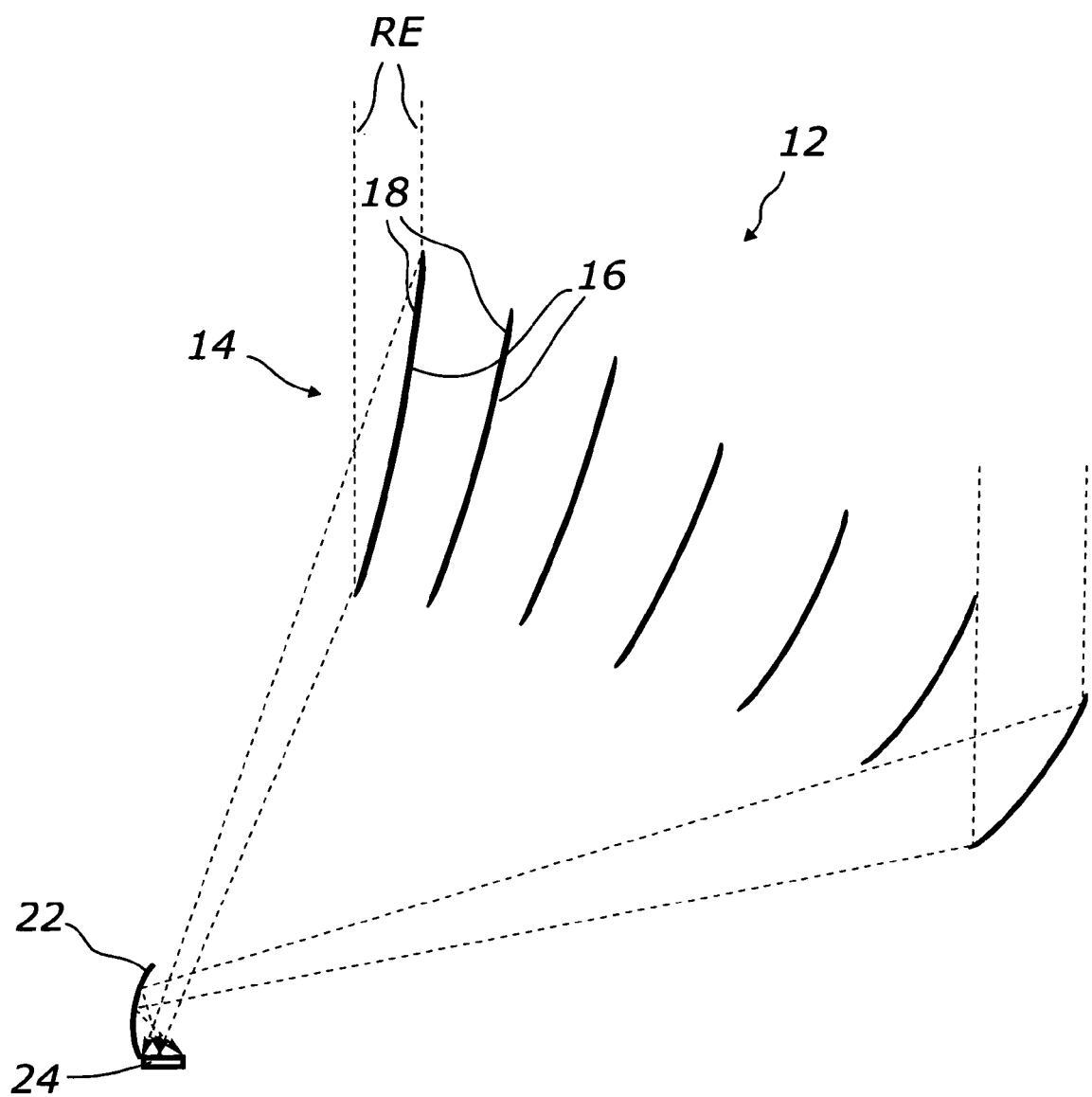
FIG. 6 is a schematic orthogonal view of a yet further embodiment of the multistage radiant energy flux transformation system.

FIGS. 5 and 6 show other embodiments of the invention.

When system 12 is used to collect and convert solar energy, secondary collector 22 can be any concentrating solar concentrator of a know type. However, this invention is not only limited to this, but can be applied to the case where collector 22 further transforms the concentrated beam formed by primary collector 14 without additional concentration. For example, a system can be provided which redistributes the concentrated flux in order to obtain a better uniformity on the target. FIG. 5 shows a schematic orthogonal view of system 12 where secondary collector 22 comprises two reflective walls of planar shape to provide homogenization of the energy flux concentrated by primary collector 14. This can be useful, for example, for improving the performance of panel 24. The reflective walls should have a sufficient depth to allow for multiple reflections for at least a substantial portion of the concentrated flux striking the entrance aperture of collector 22.

The foregoing embodiments are described upon the case when the array of elements 16 of primary collector 14 comprises two symmetric segments disposed at an angle to each other. However, this invention is not only limited to this, but can be applied to the case where only one segment is used (asymmetric design), for example, as illustrated in FIG. 6. Secondary collector can be a parabolic trough or planar rectangular mirror which can intercept at least a part of concentrated energy flux reflected from uttermost reflectors 16, for example, to provide a desired flux convergence or normal energy flux incidence onto panel 24.

Alternatively, reflectors 16 can be organized in two or more arrays that can be tilted, rotated, and positioned differently relatively to each other and secondary collector 22. There are also various other possibilities with regard to the dimensions, number and relative disposition of reflectors 16, as well as individual curvatures of surfaces 18. In addition, one or more individual reflectors 16 can be selectively added, omitted, changed or replaced in primary collector 14 to provide a desired operation. Dimensions, curvatures and relative dispositions of reflectors 16 can be varied so that the concentrated beams reflected from respective surfaces 18 can be made partially overlapped, contacting, or spaced apart. It will be appreciated that primary collector 14 and secondary collector 22 can be designed in a large variety of ways so that the energy distribution in the focal line will be tailored to a desired irradiance profile.

The foregoing embodiments are also described upon the case when reflectors 16 have fixed positions relatively to each other. However, this invention is not only limited to this, but can be applied to the case where reflectors 16 can be rotated around their longitudinal axes and/or moved relatively to each other and secondary collector 22. Alternatively, secondary collector 22 can be moved and/or rotated, for example, to intercept different portions of the concentrated energy flux reflected from reflectors 16 of primary collector 14.

Although the above description contains many specificities, these should not be construed as limiting the scope of the invention but are merely providing illustrations of some of the presently preferred embodiments of this invention. While a variety of embodiments have been disclosed, it will be readily apparent to those skilled in the art that numerous modifications and variations not mentioned above can still be made without departing from the spirit and scope of the invention.

What is claimed is:

1. A multistage system for radiant energy flux transformation comprising:
   a primary energy collector comprising a plurality of spaced apart non-transparent elongated reflective elements oriented generally parallel to a reference line, said reflective elements having mirrored surfaces being inclined at predetermined angles to direct parallel incident rays toward a plurality of converging directions through spaces between adjacent pairs of said reflective elements and by means of single stage specular reflection, said angles being such as to result in the reflection of said parallel rays at a range of angles of incidence having particular values more than 45° and less than 90°, at least one mirrored surface having a concave transversal profile; and
   an elongated secondary energy collector extending parallel to said reference line and disposed in energy receiving relation to at least one of said mirrored surfaces;
   wherein at least a portion of radiant energy flux impinging on and reflected from said surfaces of said primary energy collector is intercepted and redirected by said secondary energy collector toward a predetermined direction so as to result in an improved transformation of said radiant energy flux.

2. The multistage system of claim 1 wherein said surfaces are designed and positioned to minimize screening and shadowing on other said surfaces.

3. The multistage system of claim 1 wherein said reflectors comprise mirrored strips of a rectangular planar shape.

4. The multistage system of claim 3 wherein said strips are made of a sheet metal material.

5. The multistage system of claim 1 wherein said transversal profile comprises a segment selected from the group consisting of a parabolic curve, circular arc, a parametric curve, and a spline.

6. The multistage system according to claim 1 wherein at least two of said reflective elements have identical dimensions.

7. The multistage system as defined in claim 1 wherein said primary energy collector is formed by two symmetrical segments.

8. The multistage system of claim 1 wherein said secondary energy collector comprises means for flux homogenization.

9. The multistage system of claim 1 wherein said secondary energy collector comprises means for flux concentration.

10. The multistage system of claim 1 wherein said secondary energy collector comprises a planar rectangular mirror.

11. The multistage system of claim 1 wherein said secondary energy collector comprises a trough shaped mirror.

12. The multistage system of claim 1 wherein one or more said mirrored surfaces is disposed in any one of a translated, a reversed and/or a rotated orientation relative to said secondary energy collector.

13. A solar energy collector employing the combination of a primary optical concentrator comprising a plurality of elongated mirrored reflectors positioned to reflect and direct sunlight downward to a plurality of directions converging toward a common linear focus area through spaces between adjacent pairs of said mirrored reflectors and by means of single stage specular reflection, at least one secondary optical element, and at least one photovoltaic solar cell; at least an outermost reflector of said plurality of elongated mirrored reflectors having a concave, focusing profile and a focus located in an immediate vicinity of said secondary optical element; wherein said secondary optical element is positioned to redirect at least a portion of the sunlight focused by an outermost said mirrored reflector to said photovoltaic solar cell.

14. The solar energy collector of claim 13 wherein said secondary optical element comprises one or more cylindrically shaped mirrors.

15. The solar energy collector of claim 13 wherein said secondary optical element comprises rectangular planar strips of a reflective sheet material.

16. The solar energy collector of claim 13 wherein said secondary optical element comprises a refractive transparent body.

* * * * *